May 27, 1952  C. S. ROBISON, JR  2,598,606
CONTINUOUS ROTARY DRUM THICKENER
Filed Oct. 29, 1948  2 SHEETS—SHEET 1

INVENTOR.
CLINTON S. ROBISON, JR.
BY

May 27, 1952 C. S. ROBISON, JR 2,598,606
CONTINUOUS ROTARY DRUM THICKENER
Filed Oct. 29, 1948 2 SHEETS—SHEET 2
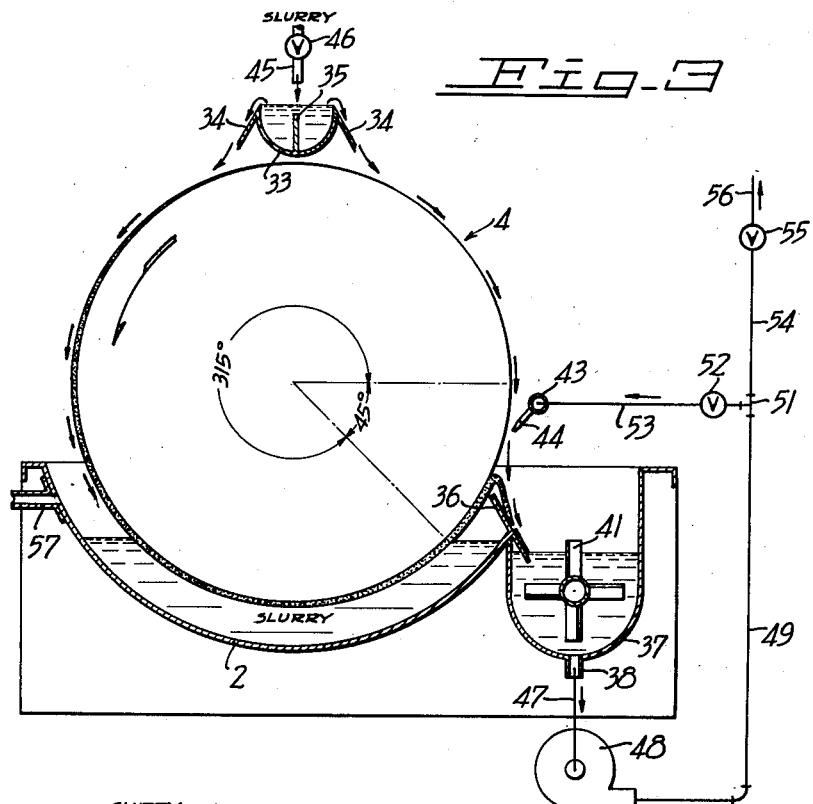
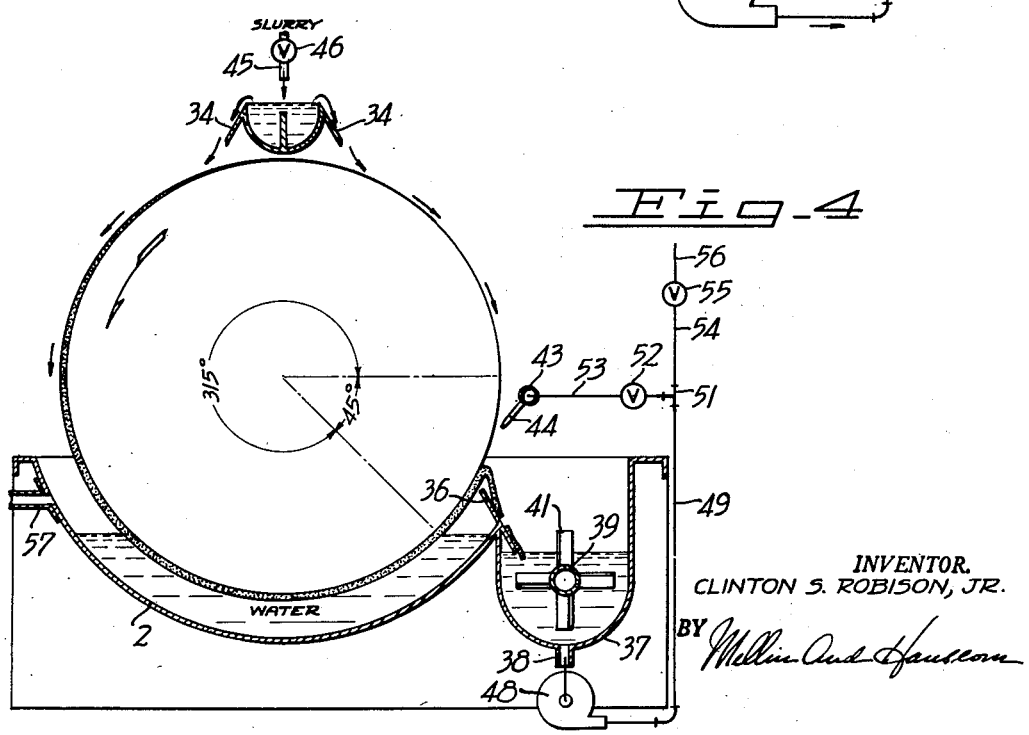
INVENTOR.
CLINTON S. ROBISON, JR.
BY Mellin and Hanson Patented May 27, 1952

2,598,606

UNITED STATES PATENT OFFICE 2,598,606

CONTINUOUS ROTARY DRUM THICKENER

Clinton S. Robison, Jr., Wilmette, Ill., assignor to Oliver United Filters Incorporated, Oakland, Calif., a corporation of Nevada Application October 29, 1948, Serial No. 57,181

5 Claims. (Cl. 210—202)

This invention relates to continuous rotary drum filters, and in general has as its object the provision of a combination top and tank fed continuous rotary drum filter arranged to serve as either a continuous thickener or as a continuous washer.

Although it is customary to think of a continuous filter as functioning to separate a liquid and a solid so as to produce a substantially dry solid and a clear filtrate, it is possible to use equipment of this type for the purpose of removing only a portion of the liquid content of the pulp or slurry to be treated so as to increase the density thereof or to use it for the purpose of washing a pulp or slurry free and clear of its original liquid vehicle. Although in both of these cases it is unnecessary, and as a matter of fact sometimes undesirable to produce a dry cake, it is essential that the operation be carried out without the introduction of any water other than that absolutely necessary.

The complete cycle of operation of all continuous rotary drum filters includes a so-called pick-up cycle, during which a cake or sheet of solids is deposited on the filter drum under the influence of an inwardly directed differential filtering pressure and a discharge cycle during which the cake or sheet deposited on the surface of the filter drum during the pick-up cycle is removed therefrom, usually with the aid of a blowback or reverse pressure applied to the underside of the sheet or cake at the discharge zone. Although in some cases the application of a blowback is sufficient to dislodge the cake from the filter medium and onto a doctor or deflecting plate, the adhesion between the cake and filter medium in some instances is so great that additional means must be resorted to for completely removing the cake. The complete and clean removal of the cake from the filter medium is essential for otherwise the filter medium soon becomes blinded with the result that the capacity of the filter is materially decreased. Depending upon the character of the pulp or slurry being handled, various expedients are resorted to to effect the discharge of the cake from the filter drum. In some instances a so-called couch roll is used, and in others, the application of a tangentially directed fluid stream, either water alone or a combination of air and water. The use of a liquid sluicing fluid is of course not permissible when it is desired to obtain as dry a cake as possible, and it may be even undesirable when the purpose of the filtering operation is to increase the density of the pulp or slurry or when it is simply desired to wash the pulp or slurry free of chemicals. Frequently these chemicals are recovered from the filtrate by distillation and obviously the more water that is introduced into the filtrate, the greater is the loss in economy of the process.

More specifically, the object of this invention is the provision of a continuous combination top and tank fed filter so arranged that it will function as either a thickener or a washer, and wherein the cake deposited on the filter drum is sluiced therefrom by the use of repulped slurry and wherein repulping is effected by the use of unfiltered slurry.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 3 is a diagrammatic illustration of the filter shown in Fig. 1, arranged to function as a continuous thickener and wherein a portion of the thickened slurry is used for the purpose of sluicing the cake from the filter drum and a portion of the unfiltered slurry is used for repulping the filtered cake;

Fig. 4 is a diagrammatic illustration of the filter shown in Fig. 1, arranged to serve as a continuous washer and wherein a portion of the washed and repulped slurry is used for sluicing the cake or sheet from the filter drum.

Figure 1:
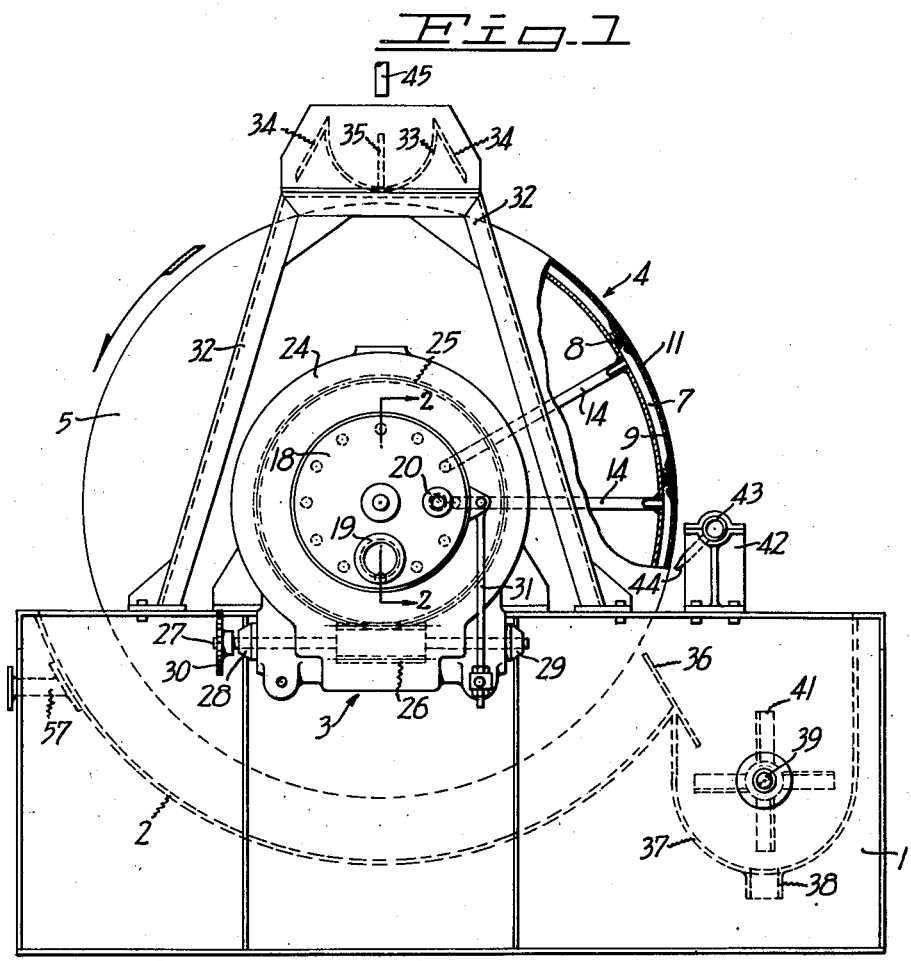
Fig. 1 is an end elevation partly in section of a combination top and tank fed filter embodying the objects of my invention.
Figure 2:
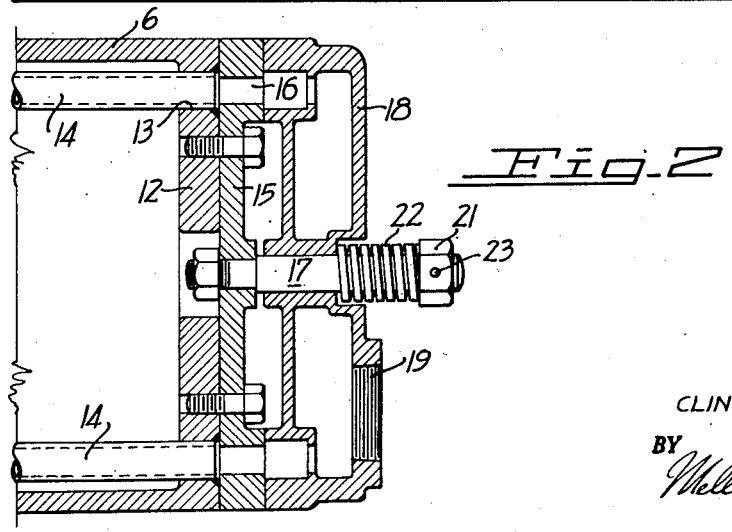
Fig. 2 is a section taken on the section line 2—2 of Fig. 1, showing the details of construction of the standard automatic filter valve associated with one of the drum trunnions of the filter shown in Fig. 1.

The filter illustrated in Fig. 1 is more or less of standard construction, and includes a pair of opposed steel fabricated tank ends 1 serving to support an arcuate filter pan 2. Mounted for rotation within the pan 2 on a horizontal axis is a filter drum generally designated by the reference numeral 4, this drum being provided at each end with drumheads 5 and with the usual trunnions 6 by which it is journaled in suitable bearings carried by the tank heads. Formed on the surface of the filter drum 4 are a plurality of contiguous, longitudinally extending filtrate compartments 7 defined by peripherally spaced division strips 8 and by supporting screens 9, all in accordance with standard practice. Disposed over the supporting screens 9 is a filter medium 11, made of fabric such as duck or of punched plastic or metal. Disposed on the end of one of the trunnions 6 is a pipe plate 12 provided with a circle of equally spaced holes 13, there being one such hole for each of the filtrate compartments 7. Connected between each of the compartments 7 and one of the holes 13 is a filtrate pipe 14. Bolted over the outer face of the pipe plate 12 is a wear plate 15 provided with holes 16 arranged to register with the outer ends of the pipes 14. Extending outwardly from the wear plate 15 coaxially therewith is a bolt 17 and mounted thereon is a valve body 18.

The valve body is divided internally in accordance with standard practice, into a vacuum compartment arranged to be connected with a source of vacuum through a threaded boss 19, and into a blowback compartment arranged to be connected with a suitable source of reverse or superatmospheric pressure through a threaded boss 20. In this particular instance, and for reasons which will be later apparent, the vacuum compartment of the valve body 18 subtends an angle of about 315° whereas its reverse pressure compartment subtends an angle of about 45°, all as diagrammatically indicated in Figs. 3 and 4. Threaded to the outer end of the bolt 17 is a nut 21 arranged to be held in any desired position by a pin 23 extending through the nut and through the bolt. Surrounding the bolt 17 and disposed between the outer face of the valve body 18 and the inner face of the nut 21 is a spring 22 serving resiliently to urge the valve body in fluid sealing engagement with the outer face of the wear plate 15.

Enclosed within a gear housing 24 and fastened to the trunnion 6 coaxially therewith is a gear 25 arranged to mesh with a worm 26 carried on a shaft 27. The shaft 27 is journaled in bearings 28 and 29 supported by one of the tank heads 1 and keyed to this shaft is a gear 30 arranged to be driven by an electric motor through a suitable speed reducer not shown but of any conventional form.

The cycle of operation of the valve can be shifted bodily by taking up or paying out on an adjusting rod 31 pivoted at one end to an ear extending outwardly from the valve body and adjustably secured at its outer end to a stationary portion of the adjacent tank head.

The filter so far illustrated is of conventional construction with the exception of the angular location of the vacuum and blowback compartments of the valve body 18.

Mounted on opposed brackets 32 upstanding from each of the tank heads 1 is a slurry feed trough 33 extending across the zenith of the drum 4 and provided on either side thereof with inclined deflecting plates 34. Optionally, a stiffening plate 35 may be welded to the ends of the feed trough and to its bottom. Welded to the pan 2 and extending across the face of the drum 4 on the rising side thereof is a deflecting plate 36. The lower edge of the plate 36 extends into a repulping trough 37 welded between the tank heads 1 and provided at its lower end with an outlet fitting 38. Journaled in the ends of the repulping trough 37 is a shaft 39 and mounted on this shaft with the trough are a plurality of longitudinally spaced repulping angle blades 41. Although not shown, the shaft 39 is arranged to be driven at one end at any desired speed, either from the same motor which drives the filter drum or from a separate motor. Upstanding from the tank heads 1 are brackets 42 and mounted on these brackets and extending across the face of the drum at about the horizontal center line thereof is a manifold 43. Spaced along this manifold are a plurality of sluicing nipples 44 directed tangential to the filter drum 4. Disposed above the feed trough 33 is a slurry feed pipe 45 provided with a valve 46.

As shown in Figs. 3 and 4, the outlet 38 of the repulping trough 37 is connected through a pipe 47 with the intake of a pump 48. Communicating with the discharge of this pump through a pipe 49 with a T 51, which in turn communicates through a valve 52 and a pipe 53 with the manifold 43 and through a pipe 54 and a valve 55 with a takeoff 56.

From an inspection of Fig. 3 it is to be noted that when this type of filter is used as a thickener, slurry is fed to the feed trough 33 through the valve 46 at such a rate that it overflows the deflecting plates 34 and down both sides of the drum. A portion of the slurry cascading down each side of the drum is deposited thereon as a cake under the influence of the differential filtering pressure to which this portion of the drum is subjected. A portion of the slurry cascading down the rising side of the drum is received by the repulping trough and a portion of the slurry cascading down the descending side of the drum is received in the filter pan 2. Some of the slurry contained in the pan 2 is picked up on the drum as a cake due to the inwardly directed differential filtering pressure to which this portion of the drum is also subjected. It will therefore be seen that in this type of operation, the pick-up cycle subtends an angle of substantially 315° extending from a point opposite the sluicing nipples counterclockwise to a point where the drum emerges from the slurry contained in the pan 2. At the end of the pick-up cycle, and through substantially an angle of 45°, each of the filtrate compartments is subjected to a reverse pressure or blowback so as to release the cake from the filter medium along a zone adjacent the deflecting plate 36 and the sluicing nipples 44. Since the sluicing nipples 44 are directed downwardly and tangentially with respect to the filter drum, the repulped slurry passing through these nipples serves to sluice the cake from the drum from which it falls into the repulping chamber trough. In the trough 37 the filter cake is repulped with some of the slurry passing downwardly over the ascending side of the drum. The repulped slurry passes through the pump 48, a portion of it being recycled through the valve 52 and the pipe 53 to the manifold 43 and a portion thereof going out through the pipe 54 the valve 55 and the takeoff pipe 56 for further processing. It will therefore be seen that by resorting to this type of operation the addition of water for repulping and for sluicing the cake from the filter drum is avoided, for as above stated sluicing is effected by means of repulped slurry and repulping is effected by the use of unfiltered slurry. The density of the repulped slurry can of course be regulated by properly setting the valves 52 and 55.

When as shown in Fig. 4, the filter is used as a washer, wash water is continuously delivered to the pan 2 through an inlet 57, and the slurry valve 46 is so adjusted that the slurry passing over the deflecting plates 34 cascades down both sides of the drum but in insufficient quantities to reach either the pan 2 or the repulping trough 37. In this instance, the cake is formed on the drum beginning with a point at the horizontal center line thereof immediately above the manifold 43 and clear around the drum to a point at which the cake enters the body of wash water contained in the pan 2. The cake formed on the drum is sluiced therefrom by repulped slurry passing through the sluicing nipples 44, enters the repulping trough 37 by passing over the deflecting plate 36, and is there thoroughly agitated by the blades 41 without the addition of water or unfiltered slurry. A portion of the repulped slurry after passing through the pump 48 is returned to the manifold 43 for the purpose of sluicing the cake from the drum and a portion of it passes outwardly through the valve 55 to further processing. Sluicing with the repulped pulp or slurry is possible for the consistency of this material is that of a thick pea soup.

From the above description it can be seen that I have provided a continuous rotary drum filter which is capable of being used either as a thickener or as a washer. In the former case, the pick-up cycle covers substantially 315° of the complete cycle of operation, unfiltered pulp is used for repulping the filter cake, and repulped slurry is utilized for the purpose of sluicing the cake from the filter drum. When used as a washer, the pick-up cycle extends over substantially 225°, discharge is effected with repulped slurry, and washing is effected by the use of clear water.

This type of equipment and method of operation is particularly useful in thickening materials such as mill starch and gluten and in washing materials such as table starch and calcium sulphate.

I claim:

1. A continuous filter comprising: a pan; a filter drum formed on its surface with a plurality of filtrate compartments and arranged to rotate through said pan on a horizontal axis; a repulping trough adjoining said pan on the rising side of said drum; a feed trough mounted above the upper side of said drum and parallel to the longitudinal axis thereof, the sides of said trough being provided with downwardly extending overflow lips; a sluicing manifold extending across the rising side of said drum between the zenith thereof and said repulping trough; sluicing nipples mounted on said manifold, said nipples being directed downwardly and tangentially to said drum; a conduit connected at one end to the bottom of said repulping trough and at its other end to the intake of a pump; a conduit connecting the discharge of said pump with said manifold and with a pulp takeoff; and an automatic filter valve operatively associated with said filter drum for subjecting said filtrate compartments successively to an inwardly directed differential filtering pressure and to a reverse pressure, said reverse pressure being applied at the discharge zone adjacent said sluicing nipples and said differential filtering pressure being applied during the remainder of the cycle of operation of said filter.

2. A continuous filter comprising: a pan; a filter drum formed on its surface with a plurality of filtrate compartments and arranged to rotate through said pan on a horizontal axis; a repulping trough adjoining said pan on the rising side of said drum, said trough being provided with an inclined deflecting plate extending thereinto; a feed trough mounted across the upper side of said drum, said feed trough being provided with inclined deflecting plates extending downwardly towards said drum; a sluicing manifold extending across the rising side of said drum between the zenith thereof and said repulping trough; sluicing nipples mounted on said manifold, said nipples being directed downwardly and tangential to said drum; a conduit connected at one end to the bottom of said repulping trough and at its other end to the intake of a pump; a conduit connecting the discharge of said pump with said manifold and with a pulp takeoff; and an automatic filter valve operatively associated with said filter drum for subjecting said filtrate compartments successively to an inwardly directed differential filtering pressure and to a reverse pressure, said reverse pressure being applied at the discharge zone adjacent said sluicing nipples and said differential filtering pressure being applied during the remainder of the cycle of operation of said filter.

3. A method of processing slurry comprising: flowing a body of said slurry over the zenith of the rotating drum of a continuous rotary drum filter and down at least the upper halves of its ascending and descending sides while subjecting said upper halves and the slurry flowing thereover to an inwardly directed differential filtering pressure to continuously form a layer of wet pulp on said drum; passing said layer of wet pulp through a fluid pool while subjecting said layer of wet pulp to an inwardly directed differential filtering pressure; sluicing said layer of wet pulp from said drum while simultaneously subjecting said layer of wet pulp to a reverse pressure; repulping the sluiced pulp and using a portion of the repulped pulp for sluicing said layer of wet pulp from said drum.

4. The method of operating a continuous rotary drum filter comprising: flowing slurry to be filtered over the zenith of the drum of said filter down its descending side and into a first pool of unfiltered slurry and down the ascending side of said drum into a second pool of slurry; agitating the slurry in said second pool; continuously sluicing cake from said drum into said second pool with a portion of the agitated slurry; continuously subjecting substantially the entire filtering surface of said drum other than that portion thereof from which said cake is being sluiced to an inwardly directed differential pressure; continuously subjecting said latter portion to a reverse pressure so as to aid in the removal of cake therefrom; and continuously removing a portion of the slurry from said second pool for further processing.

5. A method of processing slurry comprising: flowing a body of said slurry over the zenith of the rotating drum of a rotary drum filter and down at least the upper halves of its ascending and descending sides while subjecting said upper half and the slurry flowing thereover to an inwardly directed differential filtering pressure to continuously form a layer of wet pulp on said drum; passing said layer of wet pulp through a bath of wash water; sluicing said washed pulp from said drum into a pool of washed pulp; agitating said pool of washed pulp; using a portion of the washed, agitated pulp for sluicing the washed pulp from said drum; and continuously removing a portion of the washed, agitated pulp for further processing.

CLINTON S. ROBISON, Jr.

REFERENCES CITED

The following references are of record in the file of this patent:

UNITED STATES PATENTS

| Number | Name | Date |
|---|---|---|
| 915,436 | Hencke | Mar. 16, 1909 |
| 1,059,327 | Akins | Apr. 15, 1913 |
| 1,198,880 | Wagner | Sept. 19, 1916 |
| 1,212,978 | Malone | Jan. 16, 1917 |
| 1,577,584 | Miller | Mar. 23, 1926 |
| 2,027,652 | Raisch | Jan. 14, 1936 |
| 2,102,780 | Bielfeldt | Dec. 21, 1937 |
| 2,115,211 | Overbaugh | Apr. 26, 1938 |
| 2,285,649 | Evans | June 9, 1942 |
| 2,352,330 | Lee | June 27, 1944 |
| 2,499,412 | Peterson | Mar. 7, 1950 |